(12) United States Patent
Silverman et al.

(10) Patent No.: US 12,676,725 B2
(45) Date of Patent: Jul. 7, 2026

(54) NETWORK WITH PILOT TONE OVERLAP AVOIDANCE

(71) Applicant: Cisco Technology, Inc., San Jose, CA (US)

(72) Inventors: Matthew A. Silverman, Shaker Heights, OH (US); Brian D. Hart, Sunnyvale, CA (US); Sivadeep R. Kalavakuru, Akron, OH (US); Ardalan Alizadeh, Milpitas, CA (US); John M. Swartz, Lithia, FL (US)

(73) Assignee: Cisco Technology, Inc., San Jose, CA (US)

( * ) Notice: Subject to any disclaimer, the term of this patent is extended or adjusted under 35 U.S.C. 154(b) by 391 days.

(21) Appl. No.: 18/359,737

(22) Filed: Jul. 26, 2023

(65) Prior Publication Data

US 2024/0380559 A1 Nov. 14, 2024

Related U.S. Application Data

(60) Provisional application No. 63/501,555, filed on May 11, 2023.

(51) Int. Cl.
| | |
|---|---|
| *H04W 4/00* | (2018.01) |
| *H04L 5/00* | (2006.01) |
| *H04W 88/08* | (2009.01) |

(52) U.S. Cl.
CPC .......... *H04L 5/0073* (2013.01); *H04L 5/0048* (2013.01); *H04W 88/08* (2013.01)

(58) Field of Classification Search
CPC .... H04L 5/0073; H04L 5/0048; H04W 88/08; H04W 24/02
See application file for complete search history.

(56) References Cited

U.S. PATENT DOCUMENTS

| | | | | |
|---|---|---|---|---|
| 8,630,226 B2 * | 1/2014 | Kawamura | .......... | H04B 1/7103 |
| | | | | 370/328 |
| 9,088,392 B2 * | 7/2015 | Obuchi | ................ | H04L 1/0027 |
| 2006/0133381 A1 | 6/2006 | Wang | | |

(Continued)

FOREIGN PATENT DOCUMENTS

| | | | | |
|---|---|---|---|---|
| CN | 203151493 U | * | 8/2013 | |
| CN | 103354469 A | * | 10/2013 | |

(Continued)

OTHER PUBLICATIONS

International Search Report and Written Opinion for International Application No. PCT/US2024/027036, mailed Sep. 13, 2024, 13 Pages.

*Primary Examiner* — Thai Dinh Hoang
(74) *Attorney, Agent, or Firm* — Patterson + Sheridan, LLP

(57) ABSTRACT

The present disclosure describes a network and a method of operating the network. The method includes determining that a portion of a first channel of a first access point overlaps a portion of a second channel of a second access point and in response to determining that the portion of the first channel overlaps the portion of the second channel, adjusting the first access point so that the first access point refrains from transmitting using frequencies in the portion of the first channel that the second access point uses to transmit pilot tones in the portion of the second channel.

8 Claims, 8 Drawing Sheets

600

(56)  References Cited

U.S. PATENT DOCUMENTS

| | | | | |
|---|---|---|---|---|
| 2010/0113006 A1 * | 5/2010 | Pajjuri | ................. | H04W 24/02 |
| | | | | 455/423 |
| 2011/0026482 A1 * | 2/2011 | Li | ...................... | H04W 72/044 |
| | | | | 370/329 |
| 2017/0373908 A1 | 12/2017 | Choi et al. | | |
| 2018/0167182 A1 * | 6/2018 | Cao | ...................... | H04L 5/0037 |
| 2019/0356446 A1 * | 11/2019 | Kim | ...................... | H04L 5/0053 |
| 2020/0014509 A1 | 1/2020 | Asterjadhi et al. | | |
| 2021/0378054 A1 | 12/2021 | Belur Ramachandra et al. | | |
| 2023/0009996 A1 | 1/2023 | Ciochina et al. | | |
| 2023/0055895 A1 | 2/2023 | Sun et al. | | |
| 2023/0105571 A1 | 4/2023 | Mohamed Kasim | | |
| 2024/0380559 A1 * | 11/2024 | Silverman | ............ | H04L 5/0073 |

FOREIGN PATENT DOCUMENTS

| | | | | | |
|---|---|---|---|---|---|
| CN | 113472424 A | * | 10/2021 | ......... | H04B 7/18515 |
| CN | 113727383 A | * | 11/2021 | ........... | H04W 24/08 |
| KR | 102153544 B1 | * | 9/2020 | ........ | H04L 27/2676 |
| WO | WO-2018201986 A1 | * | 11/2018 | ........... | H04L 5/0048 |
| WO | WO-2019050371 A1 | * | 3/2019 | ........... | H04W 72/20 |
| WO | WO-2020029228 A1 | * | 2/2020 | ........... | H04L 5/0091 |
| WO | WO-2021154128 A1 | * | 8/2021 | ......... | H04L 25/0226 |
| WO | WO-2024233188 A1 | * | 11/2024 | ........... | H04L 5/0073 |

* cited by examiner

100

Network
Controller

106

104C

Access Point

104B

Access Point

104A

Access Point

Device

102

Device

102

108

110

104A/104B

NETWORK WITH PILOT TONE OVERLAP AVOIDANCE

CROSS-REFERENCE TO RELATED APPLICATIONS

This application claims benefit of co-pending U.S. provisional patent application Ser. No. 63/501,555 filed May 11, 2023. The aforementioned related patent application is herein incorporated by reference in its entirety.

TECHNICAL FIELD

Embodiments presented in this disclosure generally relate to wireless networking. More specifically, embodiments disclosed herein a wireless network with pilot tone overlap avoidance.

BACKGROUND

Wireless fidelity (WiFi) networks may include access points that transmit in different channels. Devices in the WiFi networks may receive the transmitted messages from the access points.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
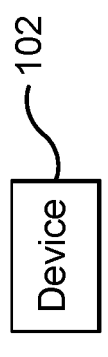
FIG. 1A illustrates an example system.

The present disclosure describes a network and a method of operating the network. According to an embodiment, a method includes determining that a portion of a first channel of a first access point overlaps a portion of a second channel of a second access point and in response to determining that the portion of the first channel overlaps the portion of the second channel, adjusting the first access point so that the first access point refrains from transmitting using frequencies in the portion of the first channel that the second access point uses to transmit pilot tones in the portion of the second channel.

According to another embodiment, a network controller includes a memory and a processor communicatively coupled to the memory. The processor determines that a portion of a first channel of a first access point overlaps a portion of a second channel of a second access point and in response to determining that the portion of the first channel overlaps the portion of the second channel, adjusts the first access point so that the first access point refrains from transmitting using frequencies in the portion of the first channel that the second access point uses to transmit pilot tones in the portion of the second channel.

According to another embodiment, an access point includes a memory and a processor communicatively coupled to the memory. The processor determines that a portion of a first channel of the access point overlaps a portion of a second channel of a second access point and in response to determining that the portion of the first channel overlaps the portion of the second channel, refrains from transmitting using frequencies in the portion of the first channel that the second access point uses to transmit pilot tones in the portion of the second channel.

Example Embodiments

Wireless fidelity (WiFi) networks may include access points that transmit using different channels. For example, the access points may transmit pilot tones and data tones using certain frequencies in these channels. The pilot tones may be used to supervise, control, equalize, or synchronize communications over the channel. The data tones may be used to communicate data from the access points.

In some network deployments, portions of the channels used by different access points may overlap. For example, two access points may transmit over different channels, but there may be some frequencies that are included in both channels. As a result, the two access points may transmit using some of the same frequencies, which causes interference between the two access points and degrades performance. Notably, when the access points transmit pilot tones using the same frequencies, the resulting interference may cause additional or subsequent packets transmitted by the access points to be received incorrectly.

The present disclosure describes a system and method for avoiding pilot tone overlap. A network controller in the system may detect when two access points are transmitting using channels with an overlapping frequency range. The network controller may then instruct the access points to coordinate their pilot tones in the overlapping frequency range. The access points may then refrain from transmitting pilot tones using the same frequencies in the overlapping frequency range. For example, the first access point may shift its pilot tone indices so that the first access point transmits pilot tones using frequencies in the overlapping frequency range that are different from the frequencies that the second access point uses to transmit pilot tones in the overlapping frequency range. As a result, the access points transmit pilot tones using different frequencies in the overlapping frequency range. Additionally, both access points may refrain from transmitting using the frequencies in the overlapping frequency range that the other access point uses to transmit pilot tones. As a result, both access points may encounter less interference when transmitting pilot tones using frequencies in the overlapping frequency range. In some embodiments, one of the access points (instead of the network controller) detects when the two access points are transmitting in channels with an overlapping frequency range and coordinates their pilot tones accordingly.

In certain embodiments, the system and method provide several technical advantages. For example, the system and method may reduce interference between two access points that transmit using channels with overlapping frequency ranges. As a result, the system and method may improve performance and reduce the number of packet receive failures.

FIG. 1A illustrates an example system 100, which may be a WiFi network. As seen in FIG. 1A, the system 100 includes one or more devices 102, access points 104A, 104B and 104C, and a network controller 106. Generally, one or more of the access points 104A, 104B, and 104C and/or the network controller 106 may detect when the access points 104A, 104B, or 104C are using overlapping frequency ranges to transmit messages to the devices 102. The access points 104A, 104B, and 104C and/or the network controller 106 may then coordinate the frequencies used by the access points 104A, 104B, and 104C to transmit pilot tones in the overlapping frequency ranges. In this manner, the system 100 reduces interference in the overlapping frequency ranges, which improves network performance and the reception of packets transmitted by the access points 104A, 104B, and 104C, in certain embodiments.

The device 102 may be any suitable device that wirelessly connects to one or more access points 104A, 104B, and 104C. As an example and not by way of limitation, the device 102 may be a computer, a laptop, a wireless or cellular telephone, an electronic notebook, a personal digital assistant, a tablet, or any other device capable of receiving, processing, storing, or communicating information with other components of the system 100. The device 102 may be a wearable device such as a virtual reality or augmented reality headset, a smart watch, or smart glasses. The device 102 may also include a user interface, such as a display, a microphone, keypad, or other appropriate terminal equipment usable by the user. The device 102 may include a hardware processor, memory, or circuitry configured to perform any of the functions or actions of the device 102 described herein. For example, a software application designed using software code may be stored in the memory and executed by the processor to perform the functions of the device 102.

The access points 104A, 104B, and 104C facilitate wireless communication in the system 100. One or more devices 102 may connect to the access points 104A, 104B, and 104C. The access points 104A, 104B, and 104C may then facilitate wireless communication for the connected devices 102. For example, the access points 104A, 104B, and 104C may transmit messages to connected devices 102. As another example, the access points 104A, 104B, and 104C may receive messages transmitted by the devices 102. The access points 104A, 104B, and 104C may then direct that message towards its intended destination. The system 100 may include any number of access points 104.

The network controller 106 may facilitate or manage the access points 104A, 104B, and 104C. For example, the network controller 106 may control which frequencies the access points 104A, 104B, and 104C use to transmit messages to the devices 102. As another example, the network controller 106 may control which frequencies the access points 104A, 104B, and 104C refrain from using to transmit messages. In some embodiments, the network controller 106 is integrated within one or more of the access points 104A, 104B, and 104C, and the one or more access points 104A, 104B, and 104C may perform the functions and actions of the network controller 106 described herein.

Figure 1A:
Figure 1B:
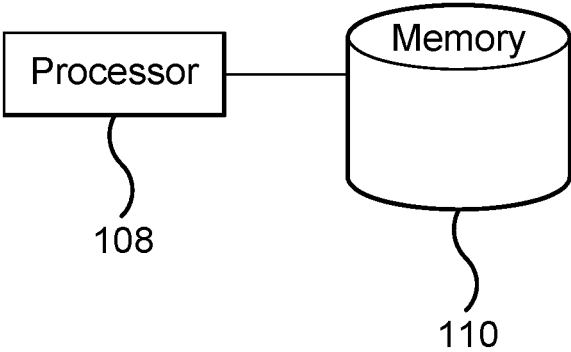
FIG. 1B illustrates components of the system of FIG. 1A.

FIG. 1B illustrates components of the system 100 of FIG. 1A. As seen in FIG. 1B, the components include a processor 108 and a memory 110. The processor 108 and the memory 110 may be included in the access points 104A, 104B, and 104C and/or the network controller 106. The processor 108 and the memory 110 may perform the functions or actions of the access points 104A, 104B, and 104C and/or the network controller 106 described herein.

The processor 108 is any electronic circuitry, including, but not limited to one or a combination of microprocessors, microcontrollers, application specific integrated circuits (ASIC), application specific instruction set processor (ASIP), and/or state machines, that communicatively couples to memory 110 and controls the operation of the access points 104A, 104B, 104C and/or the network controller 106. The processor 108 may be 8-bit, 16-bit, 32-bit, 64-bit or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 108 may include other hardware that operates software to control and process information. The processor 108 executes software stored on the memory 110 to perform any of the functions described herein. The processor 108 controls the operation and administration of the access points 104A, 104B, 104C and/or the network controller 106 by processing information (e.g., information received from the devices 102, access points 104A, 104B, and 104C, network controller 106, and memory 110). The processor 108 is not limited to a single processing device and may encompass multiple processing devices.

The memory 110 may store, either permanently or temporarily, data, operational software, or other information for the processor 108. The memory 110 may include any one or a combination of volatile or non-volatile local or remote devices suitable for storing information. For example, the memory 110 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 110, a disk, a CD, or a flash drive. In particular embodiments, the software may include an application executable by the processor 108 to perform one or more of the functions described herein.

Generally, the access points 104A, 104B, and 104C and/or the network controller 106 may detect when the access points 104A, 104B, and 104C are transmitting using overlapping frequency ranges. For example, the access points 104A and 104B may transmit packets to the devices 102 using different channels. These channels, however, may include frequency ranges that partially or fully overlap with each other. The access point 104A and/or the network controller 106 may detect when the access point 104B is transmitting packets using a frequency that falls within the channel used by the access point 104A. For example, the access point 104A may detect the transmission from the access point 104B and determine that the frequency used by the access point 104B falls within the frequency range of the channel used by the access point 104A. As another example, the network controller 106 may receive information from the access points 104A and 104B that indicates that the access points 104A and 104B are transmitting using an overlapping frequency range.

The access points 104A and 104B and/or the network controller 106 may then coordinate the transmissions of the access points 104A and 104B in the overlapping frequency range to reduce interference in certain embodiments. For example, the access point 104A and/or the network controller 106 may communicate an instruction to the access point 104B that causes the access point 104B to refrain from transmitting pilot tones using the frequencies in the overlapping frequency range that the access point 104A uses to transmit pilot tones. Additionally, the access point 104A may shift the indices of its pilot tones so that the access point 104A changes the frequencies in the overlapping frequency range that the access point 104A uses to transmit pilot tones. The access point 104A may also refrain from transmitting using the frequencies in the overlapping frequency range that the access point 104B uses to transmit pilot tones. As a result, the access points 104A and 104B transmit pilot tones using different frequencies in the overlapping frequency range. Additionally, the access points 104A and 104B refrain from transmitting using frequencies in the overlapping frequency range that the other access point 104B or 104A uses to transmit pilot tones. In this manner, the system 100 reduces interference between the access points 104A and 104B in the overlapping frequency range, especially interference that might affect the pilot tones transmitted by the access points 104A and 104B, in certain embodiments.

In some embodiments, adjusting the access points 104A and 104B may further cause the access points 104A and 104B to refrain from sending acknowledgments (ACKs) using some or all of the frequencies in the overlapping frequency range. In some instances, the access points 104A and 104B may use frequencies outside the overlapping frequency range to transmit the acknowledgments.

Figure 2A:
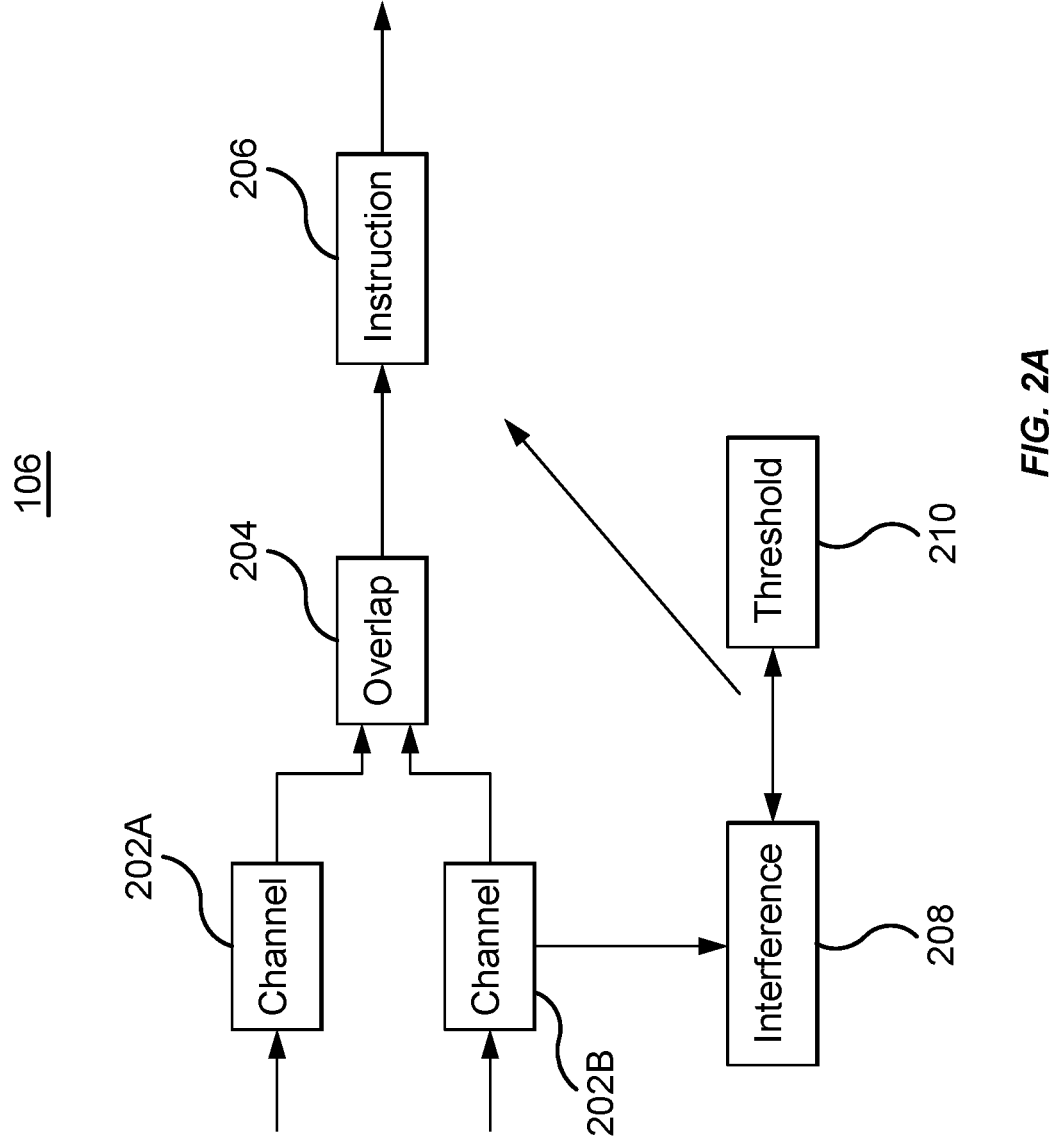
FIG. 2A illustrates an example network controller in the system of FIG. 1A.
Figure 2B:
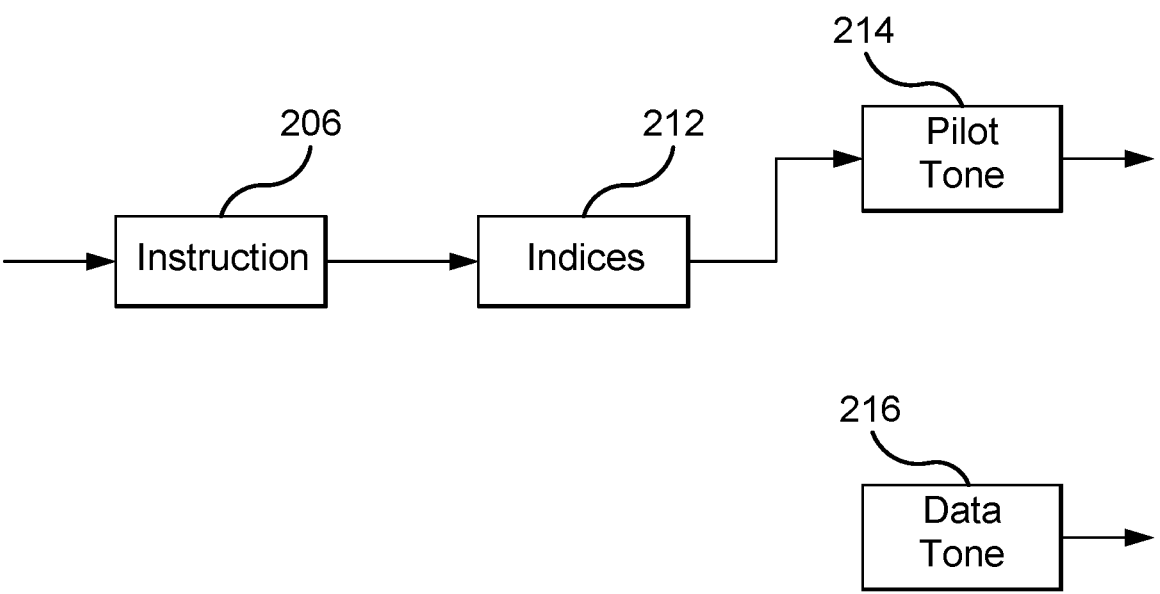
FIG. 2B illustrates an example access point in the system of FIG. 1A.

FIGS. 2A and 2B illustrate an example process in the system 100 of FIG. 1A. FIG. 2A illustrates an example network controller 106 in the system 100 of FIG. 1A. Generally, the network controller 106 detects when the access points 104A and 104B are using overlapping frequency ranges in different channels, and then the network controller 106 coordinates the transmissions of the access points 104A and 104B in the overlapping frequency range.

The network controller 106 begins by detecting the channels 202A and 202B being used by the access points 104A and 104B, respectively. Each channel 202A and 202B may include a range of frequencies that the access points 104A and 104B use to transmit packets to the devices 102. The channels 202A and 202B may include a set of frequencies that are different from each other. Additionally, the channels 202A and 202B may include a set of frequencies that are common to both the channels 202A and 202B.

The network controller 106 may detect an overlap 204 in frequencies between the channels 202A and 202B. For example, the network controller 106 may analyze the frequencies in the channels 202A and 202B to determine that some frequencies are included in both the channels 202A and 202B. These frequencies form the overlap 204. Thus, the overlap 204 represents a frequency range in the channels 202A and 202B that are used by both the access points 104A and 104B to transmit packets to the devices 102.

The network controller 106 may generate and communicate an instruction 206 to the access points 104A and 104B after determining the overlap 204. The instruction 206 may adjust the operation of the access point 104A and/or the access point 104B. For example, the instruction 206 may cause the access points 104A and 104B to coordinate the transmission of pilot tones in the frequency range indicated by the overlap 204. For example, the access point 104A may shift the indices for some pilot tones such that the access point 104A transmits those pilot tones using frequencies in the overlap 204 that are different from the frequencies in the overlap 204 that the other access point 104B uses to transmit pilot tones. As a result, the access points 104A and 104B may transmit pilot tones using different frequencies in the overlap 204. Additionally, the access points 104A and 104B may refrain from transmitting using frequencies in the overlap 204 that the other access point 104B or 104A uses to transmit pilot tones.

In some embodiments, the network controller 106 may coordinate the transmission of pilot tones in the overlap 204 using additional information. As seen in FIG. 2A, the network controller 106 may determine an interference 208 between the access points 104A and 104B in the channels 202A and 202B or in the overlap 204. For example, the network controller 106 may analyze received signal strength indicator (RSSI) values from the access points 104A and 104B for the overlap 204 to determine the interference 208. The network controller 106 may then compare the interference 208 to a threshold 210. If the interference 208 exceeds the threshold 210, then the network controller 106 may generate and communicate the instruction 206 to coordinate the transmission of pilot tones in the overlap 204. If the interference 208 does not exceed the threshold 210, then the network controller 106 may determine that there is no need to coordinate the transmission of pilot tones in the overlap 204. As a result, the network controller 106 may not generate and communicate the instruction 206 to the access points 104A and 104B.

FIG. 2B illustrates an example access point 104A or 104B in the system 100 of FIG. 1. Generally, FIG. 2B shows the access point 104A or 104B responding to the instruction 206. As see in FIG. 2B, the access point 104A or 104B receives the instruction 206. The instruction 206 may instruct the access point 104A or 104B to perform certain actions with respect to the transmission of pilot tones using frequencies in the overlap 204.

The access point 104A or 104B may shift indices 212 for the pilot tones transmitted using the frequencies in the overlap 204. By shifting the indices 212, the access point 104A or 104B may change the frequencies in the overlap 204 used by the access point 104A or 104B to transmit pilot tones. The access point 104A or 104B may then generate and transmit a pilot tone 214 according to the shifted indices 212. As a result, the access point 104A or 104B may transmit the pilot tone 214 using a frequency in the overlap 204 that is different from the frequencies in the overlap 204 used by the other access point 104B or 104A to transmit pilot tones.

The access point 104A or 104B may also transmit a data tone 216 using a frequency in the overlap 204. The data tone 216 may carry data or information for the devices 102. In certain embodiments, the access point 104A or 104B may refrain from transmitting both pilot tones 214 and data tones 216 using frequencies in the overlap 204 that are used by the other access point 104B or 104A to transmit pilot tones 214. In this manner, the access point 104A or 104B reduces interference in the overlap 204, specifically interference that may cause the pilot tones 214 to be received incorrectly in certain embodiments.

Figure 3:
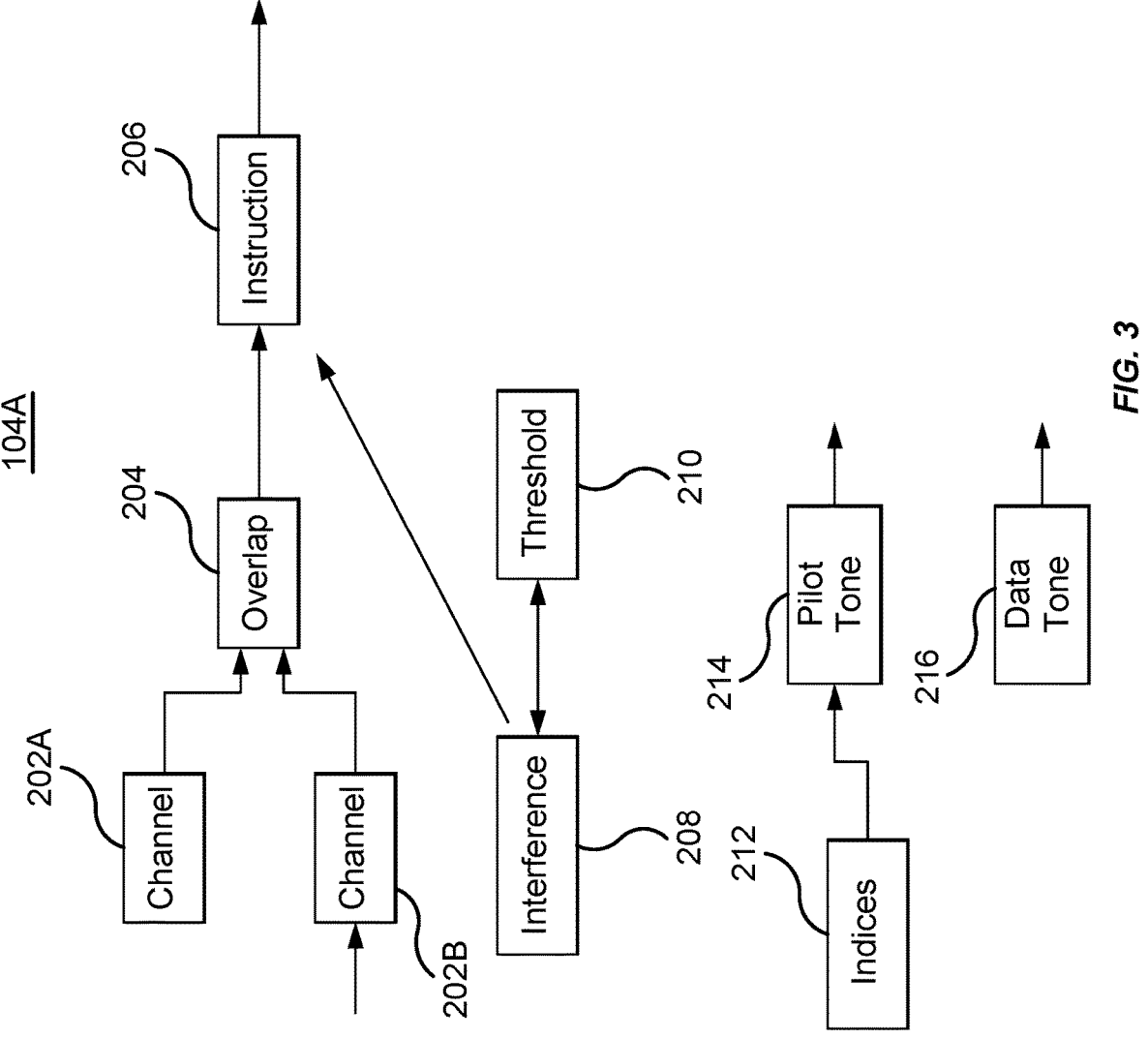
FIG. 3 illustrates an example access point in the system of FIG. 1A.

In some embodiments, the access points 104A, 104B, and 104C (instead of the network controller 106) may detect the overlap 204 and coordinate the transmission of pilot tones in the overlap 204. FIG. 3 illustrates an example access point 104A in the system 100 of FIG. 1A. As seen in FIG. 3, the access point 104A may transmit packets to the devices 102 using the channel 202A. The access point 104A may also detect that the access point 104B is using the channel 202B to transmit packets to the devices 102. For example, the access point 104A may detect the packets transmitted by the access point 104B and determine the channel 202B from those packets, or the access point 104A may receive information from the access point 104B that indicates that the access point 104B is using the channel 202B.

The access point 104A may analyze the channel 202B to determine the frequencies included in the channel 202B. The access point 104A may then determine the overlap 204, which includes the frequencies that are common to both the channel 202A and the channel 202B. The access point 104A may then generate and communicate the instruction 206 to the access point 104B that adjusts the operation of the access point 104B. For example, the instruction 206 may instruct the access point 104B to coordinate the transmission of pilot tones when using frequencies in the overlap 204. The access point 104B may then coordinate the transmission of pilot tones according to the example shown in FIG. 2B.

Like the network controller 106, the access point 104A may generate and communicate the instruction 206 using additional information. For example, the access point 104A may determine the interference 208 between the access point 104A and the access point 104B in the overlap 204. The access point 104A may receive or determine a RSSI value for the access point 104A or the access point 104B indicating a level of the interference 208. The access point 104A may then compare the interference 208 to the threshold 210. If the interference 208 exceeds the threshold 210, the access point 104A may generate and communicate the instruction 206 to the access point 104B. If the interference 208 does not exceed the threshold 210, then the access point 104A may not generate and communicate the instruction 206 to the access point 104B.

The access point 104A may also adjust how the access point 104A transmits pilot tones using frequencies in the overlap 204. For example, the access point 104A may adjust indices 212 for the pilot tones. Adjusting the indices 212 may cause the access point 104A to change a frequency in the overlap 204 that the access point 104A uses to transmit the pilot tone 214. The access point 104A may change the frequency so that the access point 104A communicates the pilot tone 214 at a frequency in the overlap 204 that the access point 104B does not use to transmit pilot tones. The access point 104A may also transmit the data tone 216 using another frequency in the overlap 204. The access point 104A may refrain from transmitting the pilot tone 214 and the data tone 216 using frequencies in the overlap 204 that the access point 104B uses to transmit pilot tones. In this manner, the access point 104A reduces interference in the overlap 204, specifically interference that might affect the reception of pilot tones.

Figure 4:
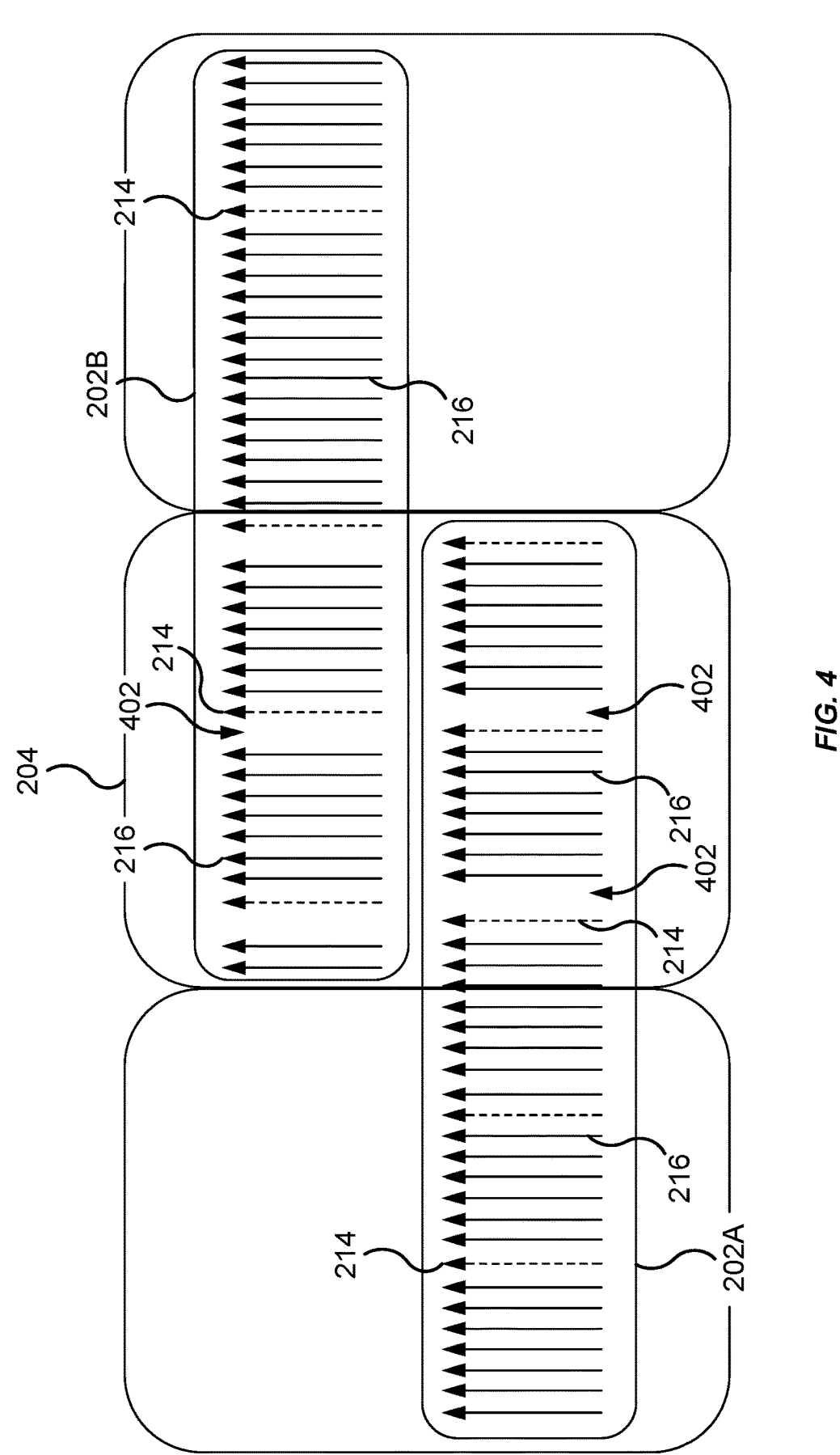
FIG. 4 illustrates example channels in the system of FIG. 1A.

FIG. 4 illustrates example channels 202A and 202B in the system 100 of FIG. 1A. The access point 104A may transmit pilot tones 214 and data tones 216 using frequencies in the channel 202A. The access point 104B may use frequencies in the channel 202B to transit pilot tones 214 and data tones 216. As seen in FIG. 4, the channels 202A and 202B include the overlap 204, which may be portions of the channels 202A and 202B that overlap. The overlap 204 may include frequencies that are common to both the channels 202A and 202B. The channels 202A and 202B also include frequencies that are outside the overlap 204. The solid arrows represent the frequencies at which the data tones 216 are transmitted. The dashed arrows represent the frequencies at which the pilot tones 214 are transmitted.

The access points 104A and 104B may coordinate their transmissions using frequencies in the overlap 204 so that the access points 104A and 104B reduce interference for the pilot tones 214 that are transmitted using frequencies in the overlap 204. As seen in FIG. 4, the access points 104A and 104B may refrain from transmitting pilot tones 214 and data tones 216 using frequencies in the overlap 204 that the other access point 104B or 104A uses to transmit pilot tones 214. The channels 202A and 202B include gaps 402 in the overlap 204. The gaps 402 represent the frequencies that the access point 104A or 104B refrains from using to transmit pilot tones 214 and data tones 216. These gaps 402 may be positioned at frequencies in the overlap 204 that the other access point 104B or 104A uses to transmit pilot tones 214. Additionally, the access points 104A and 104B may shift the indices 212 for the pilot tones 214 in the overlap 204 so that the access points 104A and 104B do not transmit pilot tones 214 using the same frequencies in the overlap 204. As a result, the access points 104A and 104B transmit pilot tones 214 using different frequencies in the overlap 204. Moreover, the access points 104A and 104B refrain from transmitting (e.g., both pilot tones 214 and data tones 216) using frequencies in the overlap 204 that the other access point 104B or 104A uses to transmit pilot tones 214. In this manner, the access points 104A and 104B reduce interference in the overlap 204 in certain embodiments.

Additionally, as seen in FIG. 4, the access points 104A and 104B may transmit data tones 216 using the same frequencies in the overlap 204. Specifically, even after the adjustments to the access points 104A and 104B, the access points 104A and 104B may continue transmitting data tones 216 using the same frequencies.

Figure 5:
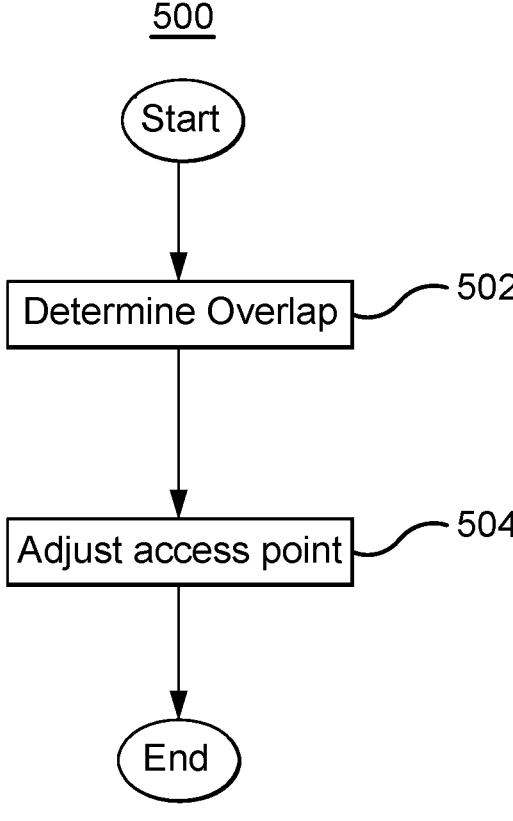
FIG. 5 is a flowchart of an example method performed in the system of FIG. 1A.

FIG. 5 is a flowchart of an example method 500 performed in the system 100 of FIG. 1A. In particular embodiments, the network controller 106 performs the method 500. By performing the method 500, the network controller 106 reduces interference between the access points 104A and 104B when the access points 104A and 104B are transmitting using an overlapping frequency range.

In block 502, the network controller 106 determines the overlap 204. The overlap 204 may include the frequencies that are common to both the channels 202A and 202B that are used by the access points 104A and 104B, respectively, to transmit packets to the devices 102. The channels 202A and 202B may include additional frequencies that are not shared by both the channels 202A and 202B. The access points 104A and 104B may both use frequencies that are in the overlap 204 to transmit, which may create interference between the access points 104A and 104B.

In block 504, the network controller 106 may adjust one or more of the access points 104A and 104B. The network controller 106 may communicate the instruction 206 to the access point 104A to adjust the access point 104A. The instruction 206 may cause the access point 204A to shift the indices 212 for the pilot tones 214 that the access point 104A transmits using frequencies in the overlap 204. As a result, the access point 104A may change the frequencies in the overlap 204 that the access point 104A uses to transmit the pilot tones 214. Additionally, the instruction 206 may cause the access point 104A to refrain from transmitting using frequencies in the overlap 204 that the access point 104B uses to transmit pilot tones 214. As a result, the instruction 206 may cause the access point 104A and the access point 104B to transmit pilot tones 214 using different frequencies in the overlap 204. Additionally, the access point 104A may refrain from transmitting (e.g., both pilot tones 214 and data tones 216) using frequencies in the overlap 204 that the access point 104B uses to transmit pilot tones 214. In this manner, the network controller 106 reduces interference in the overlap 204 that may negatively impact the reception of the pilot tones 214.

Figure 6:
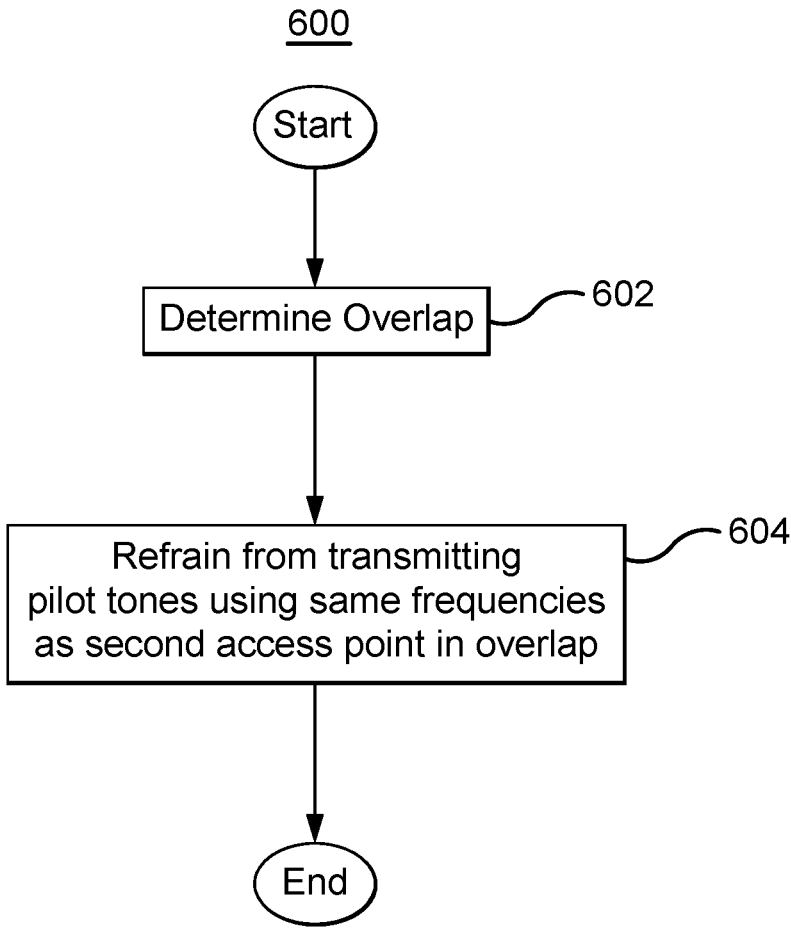
FIG. 6 is a flowchart of an example method performed in the system of FIG. 1A.

FIG. 6 is a flowchart of an example method 600 performed the system 100 of FIG. 1A. In particular embodiments, the access point 104A may perform the method 600. By performing the method 600, the access point 104A may reduce interference between the access point 104A and the access point 104B.

In block 602, the access point 104A determines the overlap 204. The overlap 204 may include frequencies that are common to both the channels 202A and 202B used by the access points 104A and 104B, respectively, to transmit packets to the devices 102. Thus, the overlap 204 includes frequencies that both the access points 104A and 104B may use to transmit packets.

In block 604, the access point 104A refrains from transmitting pilot tones 214 using the same frequencies in the overlap 204 that the second access point 104B uses to transmit pilot tones 214. For example, the access point 104A may shift the indices 212 for the pilot tones 214 transmits the pilot tones 214 using different frequencies in the overlap 204 than the frequencies in the overlap 2014 that the access point 104B uses to transmit pilot tones 214. Additionally, the access point 104A may refrain from transmitting pilot tones 214 and data tones 216 using the frequencies in the overlap 204 that the access point 104B uses to transmit pilot tones 214. In this manner, the access point 104A reduces the interference between the access point 104A and the access point 104B in the overlap 204.

In summary, the network controller 106 in the system 100 may detect when two access points 104A and 104B are transmitting using channels 202A and 202B with an overlapping frequency range. The network controller 106 may then instruct the access points 104A and 104B to coordinate their pilot tones 214 in the overlapping frequency range. The access points 104A and 104B may then refrain from transmitting pilot tones 214 using the same frequencies in the overlapping frequency range. For example, the first access point 104A may shift its pilot tone indices 212 so that the first access point 104A transmits pilot tones 214 using frequencies in the overlapping frequency range that are different from the frequencies in the overlapping frequency range that the second access point 104B uses to transmit pilot tones 214. As a result, the access points 104A and 104B transmit pilot tones 214 using different frequencies in the overlapping frequency range. Additionally, both access points 104A and 104B may refrain from transmitting using the frequencies in the overlapping frequency range that the other access point 104B or 104A uses to transmit pilot tones 214. As a result, both access points 104A and 104B may encounter less interference when transmitting pilot tones 214 using frequencies in the overlapping frequency range.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:

determining that both of a first channel of a first access point and a second channel of a second access point include a set of frequencies;

determining that the second access point uses a first frequency of the set of frequencies to transmit pilot tones;

determining that an interference between the first access point and the second access point exceeds a threshold;

in response to determining that the first channel and the second channel include the set of frequencies, that the second access point uses the first frequency to transmit the pilot tones, and that the interference between the first access point and the second access point exceeds the threshold, shifting pilot tone indices of the first access point such that the first access point (i) refrains from transmitting pilot tones using the first frequency and (ii) transmits pilot tones using a second frequency of the set of frequencies; and shifting pilot tone indices of the second access point such that the second access point refrains from transmitting pilot tones using the second frequency.

2. The method of claim 1, further comprising adjusting the first access point such that the first access point refrains from sending acknowledgments using frequencies in the set of frequencies.

3. The method of claim 1, wherein, after shifting the pilot tone indices of the first access point, the first access point transmits a data tone using a frequency in the set of frequencies and the second access point transmits a data tone using the frequency in the set of frequencies of the second channel.

4. A network controller comprising:

a memory; and a processor communicatively coupled to the memory, the processor configured to:

determine that both a first channel of a first access point and overlaps a portion of a second channel of a second access point include a set of frequencies;

determine that the second access point uses a first frequency of the set of frequencies to transmit pilot tones;

determine that an interference between the first access point and the second access point exceeds a threshold;

in response to determining that the first channel and the second channel include the set of frequencies, that the second access point uses the first frequency to transmit the pilot tones, and that the interference between the first access point and the second access point exceeds the threshold, shifting pilot tone indices of the first access point such that the first access point (i) refrains from transmitting pilot tones using the first frequency and (ii) transmits pilot tones using a second frequency of the set of frequencies; and shift pilot tone indices of the second access point such that the second access point refrains from transmitting pilot tones using the second frequency.

5. The network controller of claim 4, wherein the processor is configured to adjust the first access point such that the first access point refrains from sending acknowledgments using frequencies in the set of frequencies.

6. The network controller of claim 4, wherein, after shifting the pilot tone indices of the first access point, the first access point transmits a data tone using a frequency in the set of frequencies and the second access point transmits a data tone using the frequency in the set of frequencies.

7. A first access point comprising:

a memory; and a processor communicatively coupled to the memory, the processor configured to:

determine that both a first channel of the first access point and a second channel of a second access point include a set of frequencies;

determine that the second access point uses a first frequency of the set of frequencies to transmit pilot tones;

determine that an interference between the first access point and the second access point exceeds a threshold; and in response to determining that the first channel and the second channel include the set of frequencies, that the second access point uses the first frequency to transmit the pilot tones, and that the interference between the first access point and the second access point exceeds the threshold, shift pilot tone indices of the first access point such that the first access point (i) refrains from transmitting pilot tones using the first frequency and (ii) transmits pilot tones using a second frequency of the set of frequencies.

8. The first access point of claim 7, wherein the processor is further configured to, in response to determining that the first channel and the second channel include the set of frequencies, refrain from sending acknowledgments using frequencies in the set of frequencies.

* * * * *